US010970849B2

(12) United States Patent
Öztireli et al.

(10) Patent No.: US 10,970,849 B2
(45) Date of Patent: Apr. 6, 2021

(54) POSE ESTIMATION AND BODY TRACKING USING AN ARTIFICIAL NEURAL NETWORK

(71) Applicants: Disney Enterprises, Inc., Burbank, CA (US); ETH Zürich, Zürich (CH)

(72) Inventors: Ahmet Cengiz Öztireli, Zürich (CH); Prashanth Chandran, Zürich (CH); Markus Gross, Zürich (CH)

(73) Assignees: Disney Enterprises, Inc., Burbank, CA (US); ETH Zürich (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 97 days.

(21) Appl. No.: 16/386,173

(22) Filed: Apr. 16, 2019

(65) Prior Publication Data
US 2020/0334828 A1 Oct. 22, 2020

(51) Int. Cl.
*G06T 7/20* (2017.01)
*G06T 7/70* (2017.01)
(Continued)

(52) U.S. Cl.
CPC ............ *G06T 7/20* (2013.01); *G06F 3/011* (2013.01); *G06N 3/08* (2013.01); *G06N 20/00* (2019.01);
(Continued)

(58) Field of Classification Search
CPC .......... G06T 7/20; G06T 7/215; G06T 7/251; G06T 2207/10016; G06F 3/011;
(Continued)

(56) References Cited

U.S. PATENT DOCUMENTS 10,096,125 B1 * 10/2018 Yang ..................... G06T 7/74
2012/0120073 A1 * 5/2012 Haker ................ G06K 9/00355
345/420

(Continued)

OTHER PUBLICATIONS

Li, Jituo, et al. "Hand Tracking and Animation." *Proceedings—2009 11th IEEE International Conference on Computer-Aided Design and Computer Graphics, CAD/Graphics*, 2009. pp. 318-323. 10.1109/CADCG.2009.5246885.

*Primary Examiner* — Nirav G Patel
*Assistant Examiner* — Stephen M Brinich
(74) *Attorney, Agent, or Firm* — Farjami & Farjami LLP

(57) ABSTRACT

According to one implementation, a pose estimation and body tracking system includes a computing platform having a hardware processor and a system memory storing a software code including a tracking module trained to track motions. The software code receives a series of images of motion by a subject, and for each image, uses the tracking module to determine locations corresponding respectively to two-dimensional (2D) skeletal landmarks of the subject based on constraints imposed by features of a hierarchical skeleton model intersecting at each 2D skeletal landmark. The software code further uses the tracking module to infer joint angles of the subject based on the locations and determine a three-dimensional (3D) pose of the subject based on the locations and the joint angles, resulting in a series of 3D poses. The software code outputs a tracking image corresponding to the motion by the subject based on the series of 3D poses.

20 Claims, 7 Drawing Sheets

(51) Int. Cl.
  *G06T 11/00*    (2006.01)
  *G06N 3/08*    (2006.01)
  *G06N 20/00*   (2019.01)
  *G06F 3/01*    (2006.01)

(52) U.S. Cl.
  CPC .............. *G06T 7/70* (2017.01); *G06T 11/003* (2013.01); *G06T 2207/10016* (2013.01)

(58) Field of Classification Search
  CPC .......... G06F 3/012; G06F 3/013; G06F 3/014; G06N 20/00; G06N 20/10
  USPC ................................ 382/103, 100, 154–158
  See application file for complete search history.

(56) References Cited

U.S. PATENT DOCUMENTS

| | | | |
|---|---|---|---|
| 2015/0206003 A1* | 7/2015 | Haker | G06T 19/20 |
| | | | 345/420 |
| 2018/0268601 A1* | 9/2018 | Rad | G06T 7/75 |
| 2019/0371080 A1* | 12/2019 | Sminchisescu | G06T 19/00 |
| 2020/0027271 A1* | 1/2020 | Guay | G06T 7/73 |
| 2020/0090408 A1* | 3/2020 | Virkar | G06N 20/20 |
| 2020/0257895 A1* | 8/2020 | Yang | G06F 3/013 |

\* cited by examiner

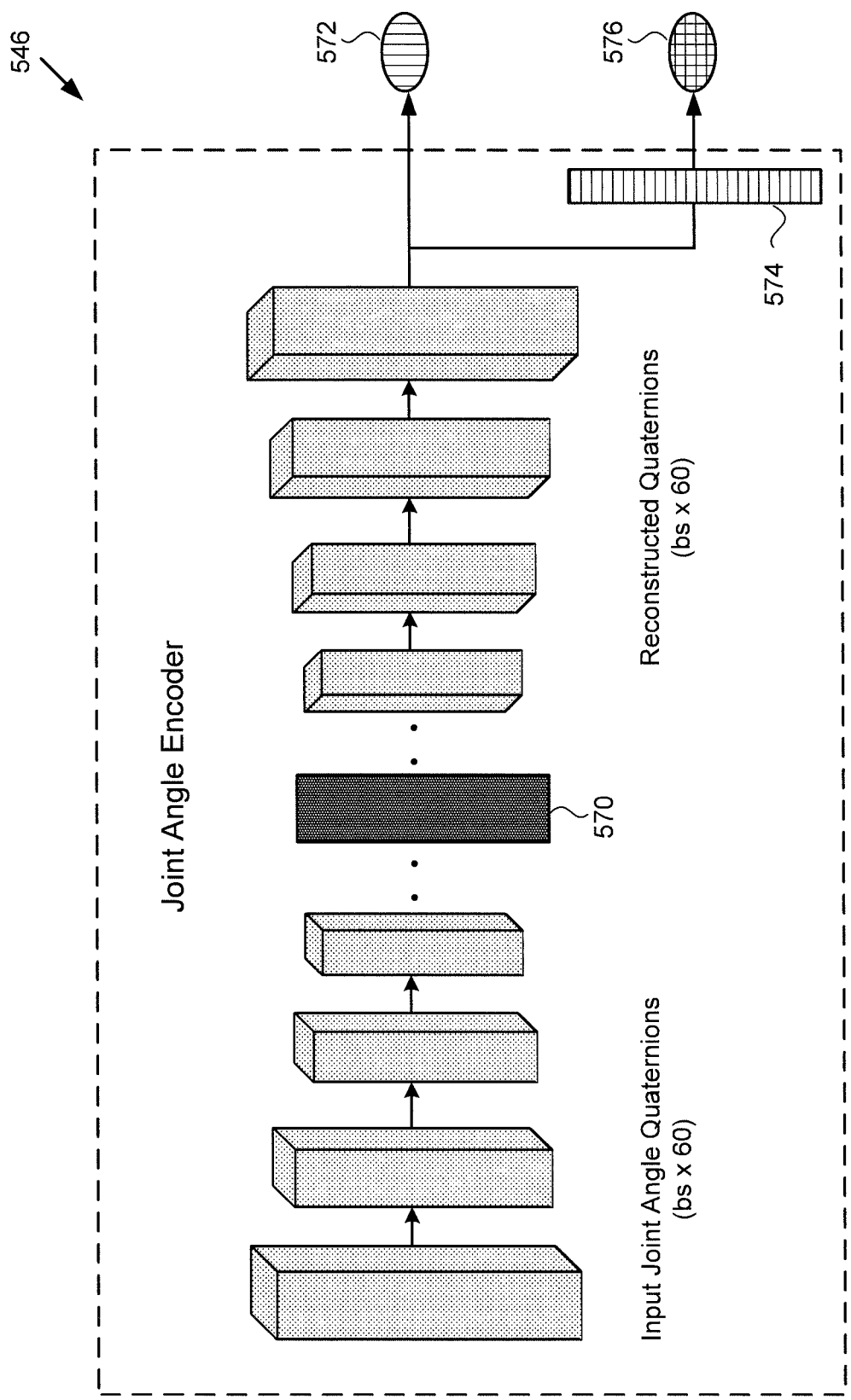

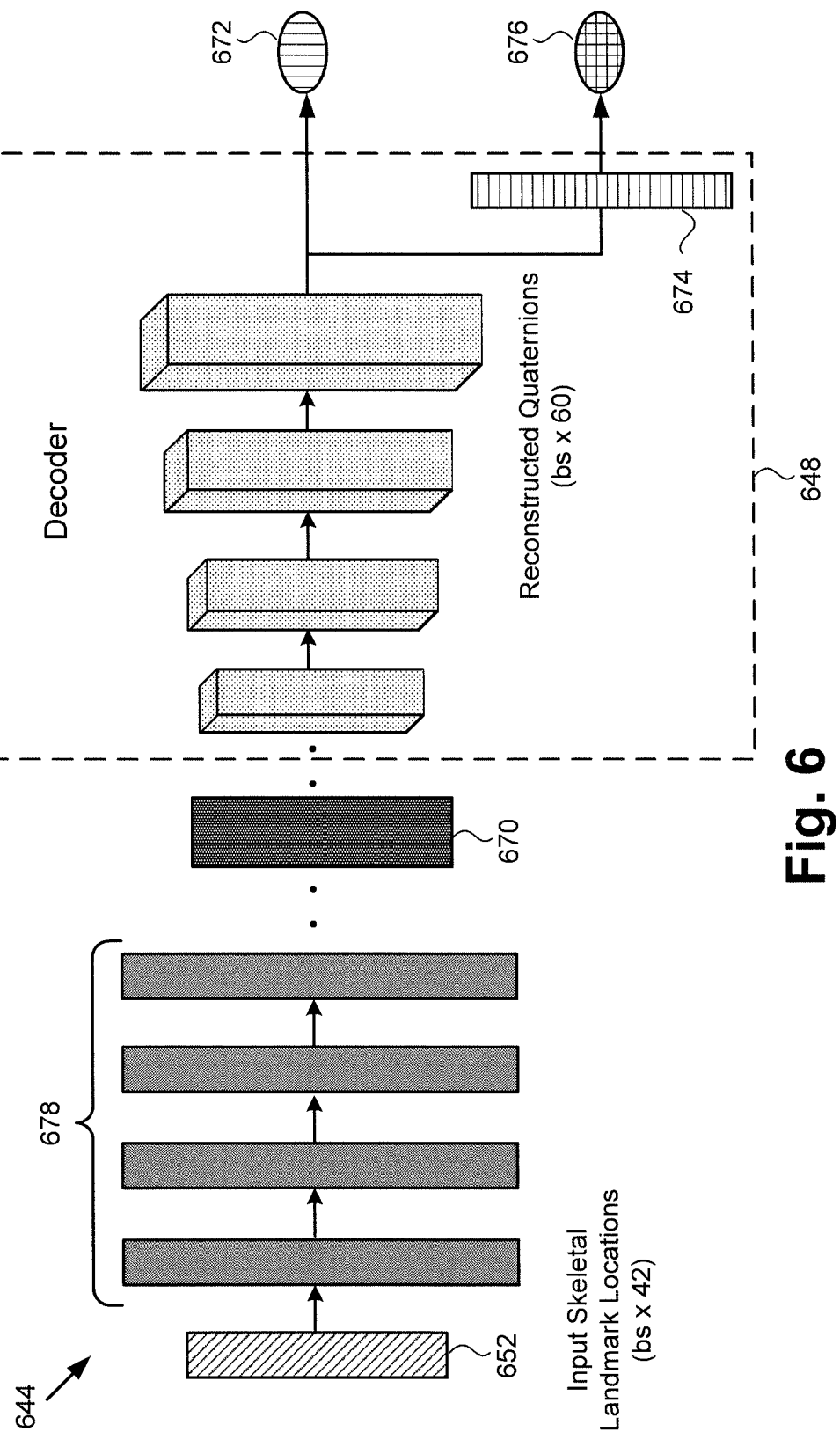

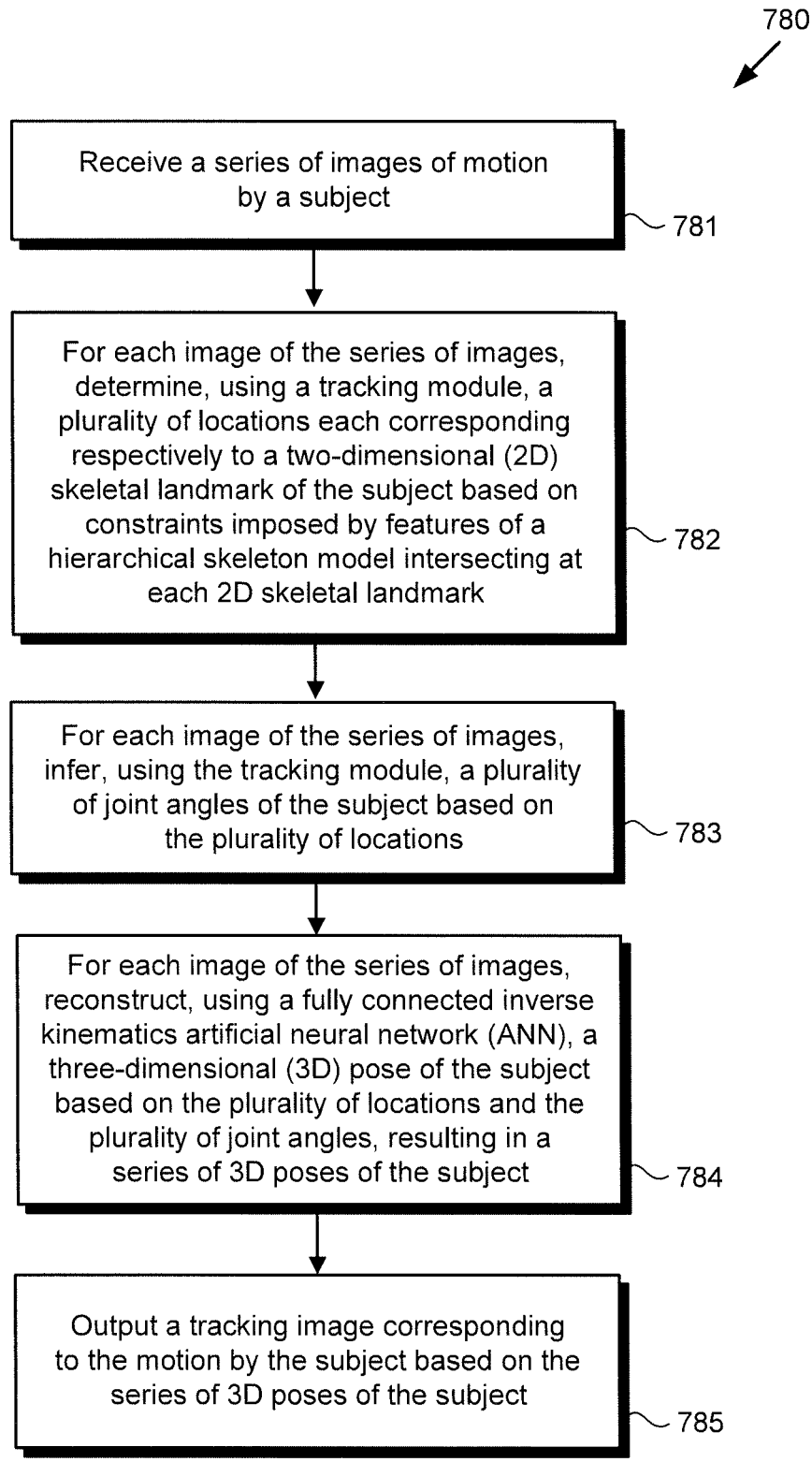

POSE ESTIMATION AND BODY TRACKING USING AN ARTIFICIAL NEURAL NETWORK

BACKGROUND

Augmented Reality (AR) and virtual reality (VR) experiences merge virtual objects or characters with real-world features in a way that can, in principle, provide a deeply immersive and powerfully interactive experience. Nevertheless, despite the relative success of digital enhancement techniques in augmenting many inanimate objects, digital augmentation of the human body continues to present substantial technical obstacles. For example, due to the ambiguities associated with depth projection, as well as the variations in human body shapes, three-dimensional (3D) human pose estimation remains a significant challenge.

In addition to AR and VR applications, accurate body tracking, in particular hand tracking, is important for effective use of the human hand as a Human Computer Interface (HCI). Applications for which use of the human hand as an HCI may be advantageous or desirable include hand tracking based character animation, for example. However, the challenges associated with pose estimation present significant problems for hand tracking as well. Consequently, there is a need in the art for a fast and accurate pose estimation and body tracking solution.

SUMMARY

There are provided systems and methods for performing pose estimation and body tracking using an artificial neural network, substantially as shown in and/or described in connection with at least one of the figures, and as set forth more completely in the claims.

BRIEF DESCRIPTION OF THE DRAWINGS

FIG. 5 shows an exemplary diagram of a joint angle encoder of the tracking module shown in FIG. 3;

FIG. 6 shows an exemplary diagram of an inverse kinematics ANN shown in FIG. 3; and FIG. 7 shows a flowchart presenting an exemplary method for performing pose estimation and body tracking using an ANN of the tracking module of FIG. 3, according to one implementation.

DETAILED DESCRIPTION

Figure 1:
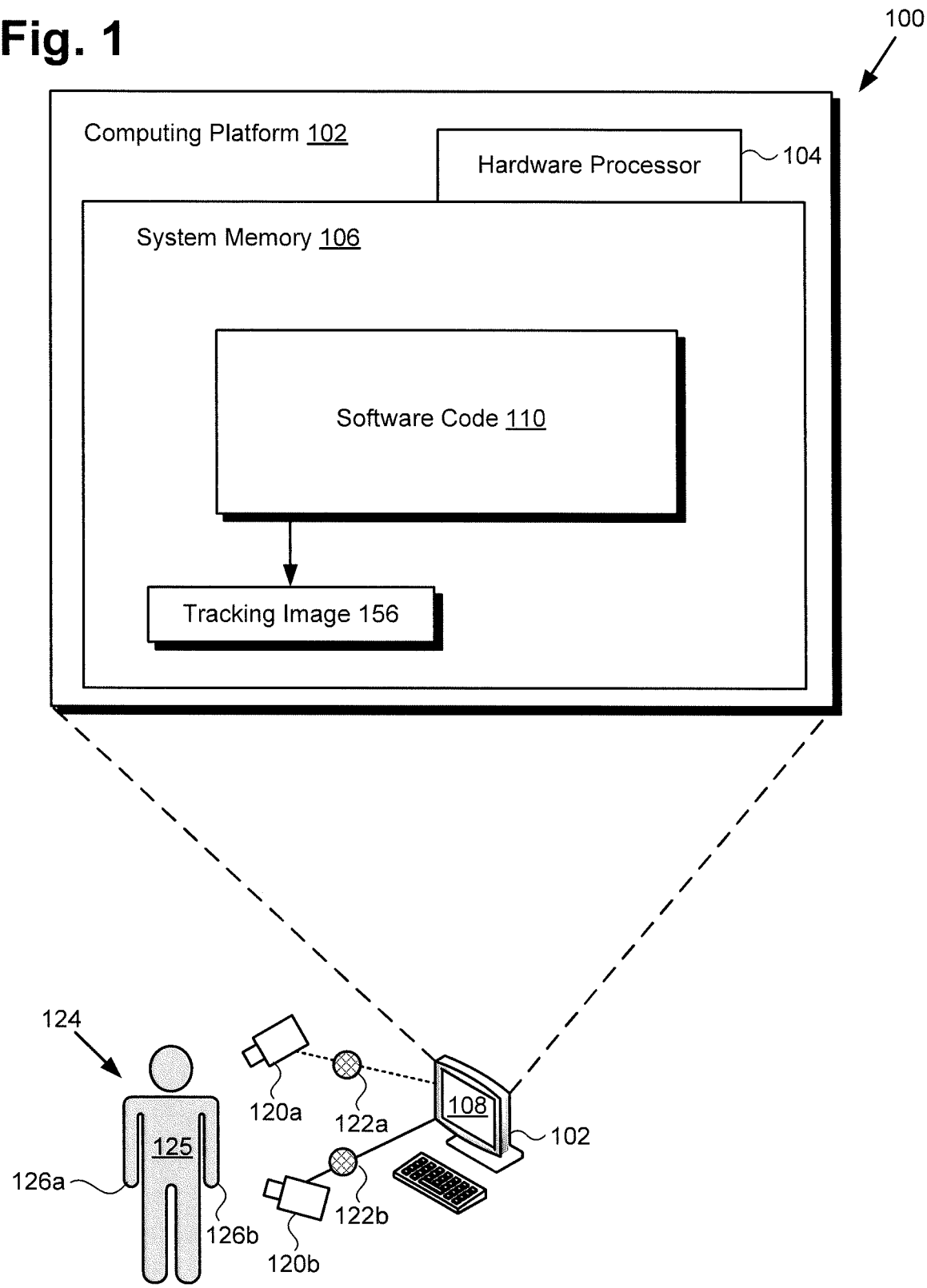
FIG. 1 shows a diagram of an exemplary system for performing pose estimation and body tracking using an artificial neural network (ANN), according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing pose estimation and body tracking using one or more artificial neural networks (ANNs) and in a manner that overcomes the drawbacks and deficiencies in the conventional art. It is noted that, as defined in the present application, an artificial neural network (ANN), or simply neural network (NN) is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve its performance of a specific task as new data is received and/or adapt to new patterns of a dynamic system. As such, various forms of ANNs may be used to make predictions about new data based on past examples or "training data". In various implementations, ANNs may be utilized to perform image processing or natural-language processing.

It is further noted that, as defined in the present application, a "hierarchical skeleton" or "hierarchical skeleton model" refers to a system for describing a collection of bones, and the joints connecting those bones, according to a hierarchy in which the location or orientation of a bone or joint is dependent on the position(s) or orientation(s) of one or more other bones and joints. This is in contrast to non-hierarchical skeletons in which individual bones and joints are treated as being independent of one another.

FIG. 1 shows a diagram of an exemplary system for performing pose estimation and body tracking using an ANN, according to one implementation. As shown in FIG. 1, pose estimation and body tracking system 100 includes computing platform 102 having hardware processor 104, system memory 106 implemented as a non-transitory storage device, and display 108. According to the present exemplary implementation, system memory 106 stores software code 110. It is noted that hardware processor 104 may be implemented as one or more processors for executing software code 110, such as one or more central processing units (CPUs) and/or one or more graphics processing units (GPUs), for example.

As further shown in FIG. 1, pose estimation and body tracking system 100 is implemented within a use environment including cameras 120a and 120b, and subject 124, which may be a human subject or robot, for example, having body 125 and hands 126a and 126b. Also shown in FIG. 1 are images 122a and 122b of motion by subject 124, as well as tracking image 156 corresponding to the motion by subject 124.

It is noted that in some implementations, pose estimation and body tracking system 100 may be configured to perform hand tracking of subject 124, i.e., tracking of hand motions by subject 124. However, in other implementations, body 125 of subject 124 may be in motion relative to cameras 120a and 120b. In those latter implementations, pose estimation and body tracking system 100 may be configured to track the motion through space of body 125 of subject 124, in addition to, or as an alternative to performing hand tracking of one or both of hands 126a and 126b of subject 124.

It is also noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Although computing platform 102 is shown as a desktop computer in FIG. 1, that representation is also provided merely as an example. More generally, computing platform 102 may be any suitable mobile or stationary computing device or system that implements data processing capabilities sufficient to implement the functionality ascribed to computing platform 102 herein. For example, in other implementations, computing platform 102 may take the form of a laptop computer, tablet computer, or smartphone, for example.

In some implementations, subject 124 may be a user of computing platform 102, and may interact with software code 110 to produce tracking image 156 corresponding to motion by subject 124. For example, subject 124 may be an animator or performance actor, motion-capture actor, etc., situated in front of cameras 120a and 120b while moving one or both of hands 126a and 126b, and may have those hand motions applied to an animated character. Alternatively, subject 124 may use hands 126a and 126b to grab the character, pose it as though it were a physical character, and have that pose applied to the animated character.

According to various implementations, tracking image 156, when generated using software code 110 executed by hardware processor 104, may be stored in system memory 106 and/or may be copied to non-volatile storage. Alternatively, or in addition, in some implementations, tracking image 156 may be rendered on display 108 of pose estimation and body tracking system 100. Display 108 may be implemented as a liquid crystal display (LCD), a light-emitting diode (LED) display, an organic light-emitting diode (OLED) display, or another suitable display screen that performs a physical transformation of signals to light.

Figure 2:
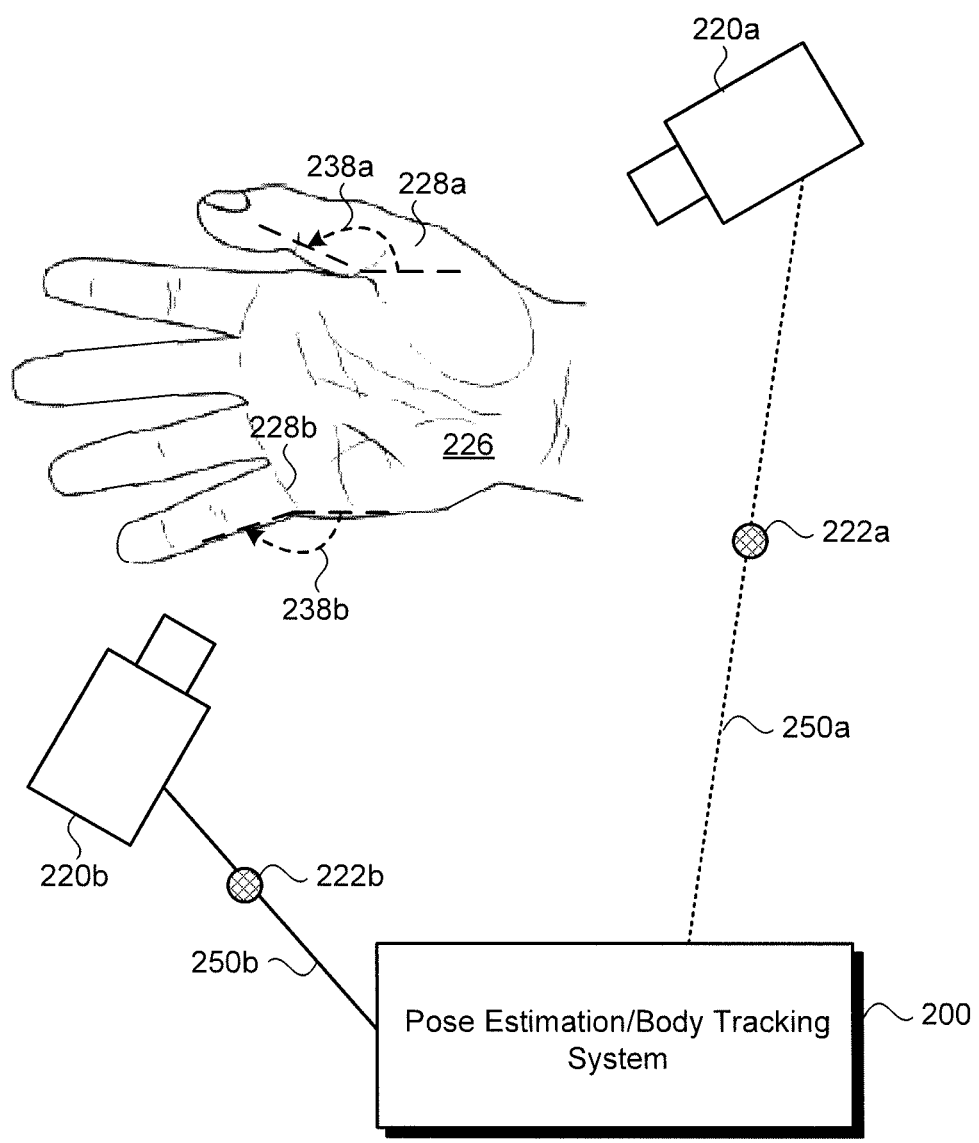
FIG. 2 shows a diagram of an exemplary use case for the system of FIG. 1 in which hand tracking is performed, according to one implementation.

FIG. 2 shows a diagram of an exemplary use case for the system of FIG. 1 in which hand tracking is performed, according to one implementation. FIG. 2 includes pose estimation and body tracking system 200, cameras 220a and 220b, and hand 226 including exemplary skeletal landmarks 228a and 228b in the form of joint positions, and exemplary joint angles 238a and 238b. It is noted, that although joint positions 228a and 228b and exemplary joint angles 238a and 238b correspond to joint information for the thumb and pinky fingers as shown, the processing of skeletal landmarks, joint position, and joint angles, according to various implementations, may be readily applicable to the other skeletal features of the hand 226, including those of the remaining fingers, palm, wrist, etc. Also shown in FIG. 2 are images 222a and 222b of motion by hand 226, wireless communication link 250a coupling camera 220a to pose estimation and body tracking system 200, and wired communication link 250b coupling camera 220b to pose estimation and body tracking system 200.

Pose estimation and body tracking system 200 corresponds in general to pose estimation and body tracking system 100, in FIG. 1, and those corresponding elements may share any of the features or functionality attributed to either corresponding element by the present disclosure. That is to say, although not shown in FIG. 2, pose estimation and body tracking system 200 may include features corresponding respectively to computing platform 102 including hardware processor 104, system memory 106 storing software code 110, and display 108. Moreover, like pose estimation and body tracking system 200, pose estimation and body tracking system 100 may be in wireless or wired communication with cameras 120a and 120b via links corresponding respectively to wireless communication link 250a and wired communication link 250b.

In addition, hand 226, in FIG. 2, corresponds in general to either or both of hands 126a and 126b of subject 124, in FIG. 1. As a result, hands 126a and 126b may share any of the characteristics attributed to hand 226 by the present disclosure, and vice versa. For example, like hand 226, hands 126a and 126b may share features corresponding respectively to exemplary joint positions or other skeletal landmarks 228a and 228b, and exemplary joint angles 238a and 238b.

Cameras 220a and 220b, and images 222a and 222b, in FIG. 2, correspond respectively in general to cameras 120a and 120b, and images 122a and 122b, in FIG. 1. Consequently, cameras 120a and 120b, and images 122a and 122b, may share any of the characteristics attributed to cameras 220a and 220b, and images 222a and 222b, by the present disclosure, and vice versa. It is noted that although FIGS. 1 and 2 show two cameras 120a/220a and 120b/220b, that representation is merely exemplary. In other implementations, pose estimation and body tracking system 100/200 may use as few as one camera, i.e., camera 120a/220a or camera 120b/220b, or may use more, or many more than two cameras.

It is further noted that in some implementations, pose estimation and body tracking system 100/200 may be in communication with one or more of cameras 120a/220a and 120b/220b (hereinafter "camera(s) 120a/220a and 120b/220b") but may not include camera(s) 120a/220a and 120b/220b. However, in other implementations, camera(s) 120a/220a and 120b/220b may be included as part of pose estimation and body tracking system 100/200. Moreover, although FIGS. 1 and 2 show camera(s) 120a/220a and 120b/220b as discrete elements, physically separate from computing platform 102 of pose estimation and body tracking system 100/200, in some implementations camera(s) 120a/220a and 120b/220b may be integrated with computing platform 102. For example, in implementations in which computing platform 102 takes the form of a tablet computer or smartphone, camera(s) 120a/220a and 120b/220b may be a still or video camera integrated with the tablet computer or smartphone.

As noted above, camera(s) 120a/220a and 120b/220b may be still image camera(s) or video camera(s), such as digital still image or digital video cameras. In some implementations, camera(s) 120a/220a and 120b/220b may be configured to capture color or black and white monocular digital images as images 122a/222a and 122b/222b. In one such implementation, camera(s) 120a/220a and 120b/220b may be red-green-blue (RGB) color camera(s), for example. Alternatively, or in addition, camera(s) 120a/220a and 120b/220b may be depth camera(s), such as RGB-D camera(s). In other implementations, camera(s) 120a/220a and 120b/220b may be infrared (IR) camera(s), or may correspond to any other suitable optical sensor(s) for obtaining images 122a/222a and 122b/222b of body 125 and/or hand or hands 126a/126b/226 (hereinafter "hand(s) 126a/126b/226") of subject 124.

Figure 3:
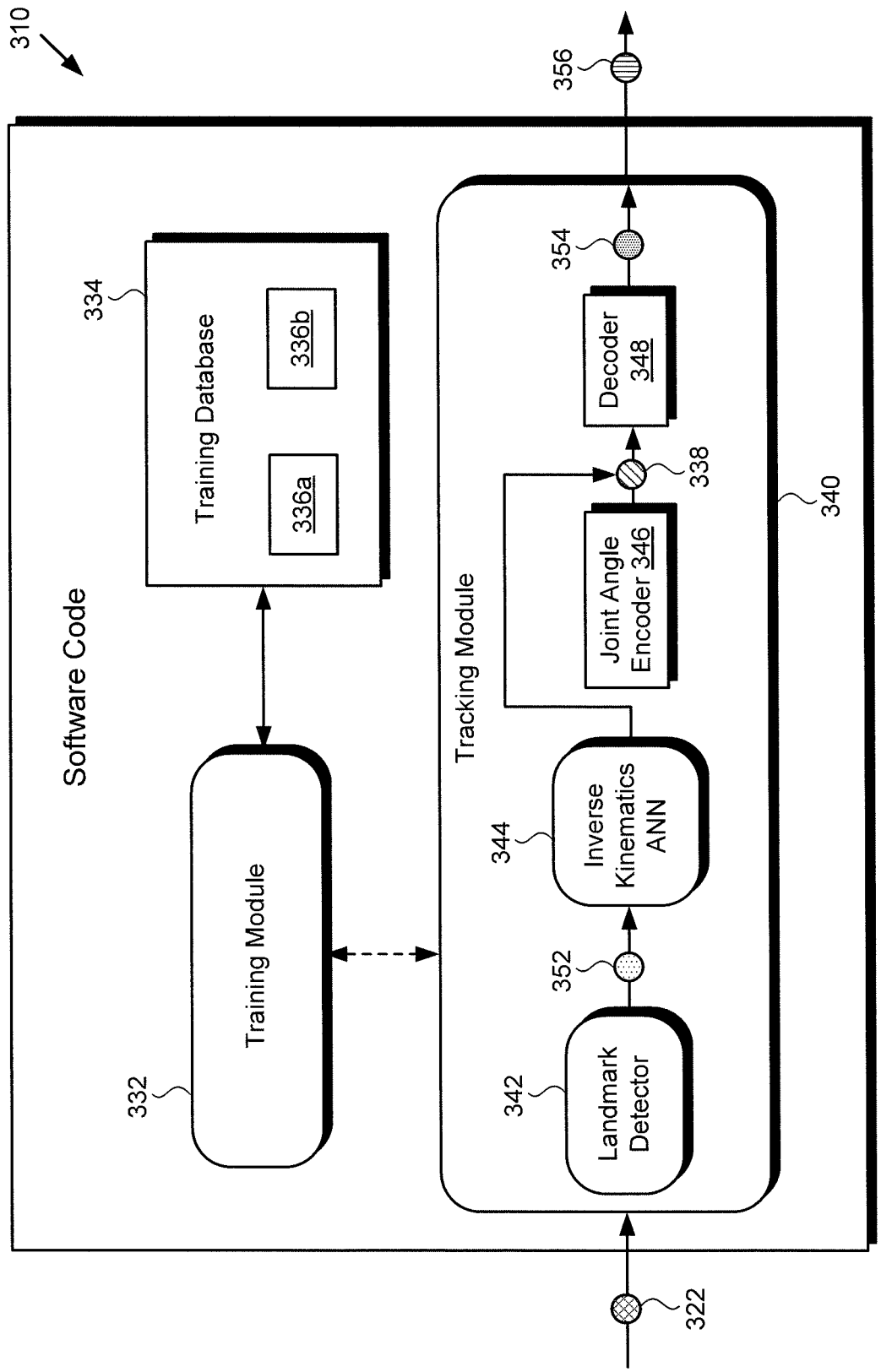
FIG. 3 shows an exemplary diagram of a software code including a tracking module having an ANN trained to perform pose estimation and suitable for execution by a hardware processor of the system shown by FIGS. 1 and 2, according to one implementation.

FIG. 3 shows exemplary software code 310 suitable for execution by hardware processor 104 of pose estimation and body tracking system 100/200, in FIGS. 1 and 2, according to one implementation. As shown in FIG. 3, software code 310 may include tracking module 340 having landmark detector 342, inverse kinematics ANN 344, joint angle encoder 346, and decoder 348. In addition, FIG. 3 shows series of images 322, locations 352 of 2D skeletal landmarks determined by landmark detector 342 of tracking module 340, joint angles 338 inferred by joint angle encoder 346 of tracking module 340, 3D poses 354 reconstructed using tracking module 340, and tracking image 356 generated using tracking module 340.

As further shown in FIG. 3, software code 310 can include training module 332, as well as training database 334 storing body image dataset 336a and dataset 336b of corresponding 3D poses with depth information. Software code 310 corresponds in general to software code 110, in FIG. 1, and those corresponding features may share any of the characteristics attributed to either corresponding feature by the present disclosure. That is to say, like software code 310, software code 110 may include a tracking module corresponding to tracking module 340, as well as features corresponding respectively to training module 332, and training database 334 storing body image dataset 336a and dataset 336b of corresponding 3D poses with depth information. However, it is noted that although FIG. 3 depicts training module 332 and training database 334 as being included in software code 110/310, that representation is merely exemplary. In other implementations, training module 332 and training database 334 may be stored remotely from software code 110/310 and may be utilized to train tracking module 340 on a computing platform other than computing platform 102.

It is further noted that, in some implementations, body image dataset 336a stored in training database 334 may include millions of realistically rendered body images, such as hand images for example. Dataset 366b stored in training database 344 may include 3D poses and depth information corresponding to the millions of body images included in body image dataset 336a. Moreover, in some implementations, body image dataset 336a and dataset 336b may be purely synthetic datasets. For example, in the exemplary use case of hand tracking, the purely synthetic datasets may comprise of millions of 2D landmark to joint angle correspondences that are constructed to cover substantially all practical poses of a human hand. This may require careful modeling of joint angles, careful modeling of correlations among joint angles, and careful modeling of common hand gestures.

Series of images 322 corresponds in general to images 122a/222a and 122b/222b, in FIGS. 1 and 2. Thus, series of images 322 may share any of the characteristics attributed to corresponding images 122a/222a and 122b/222b by the present disclosure, and vice versa. In addition, tracking image 356, in FIG. 3, corresponds in general to tracking image 156, in FIG. 1, and those corresponding features may share any of the characteristics attributed to either feature by the present disclosure. Moreover, locations 352 of 2D skeletal landmarks correspond in general to skeletal landmarks 228a and 228b, in FIG. 2, while joint angles 338 inferred by joint angle encoder 346 correspond in general to exemplary joint angles 238a and 238b.

Figure 4:
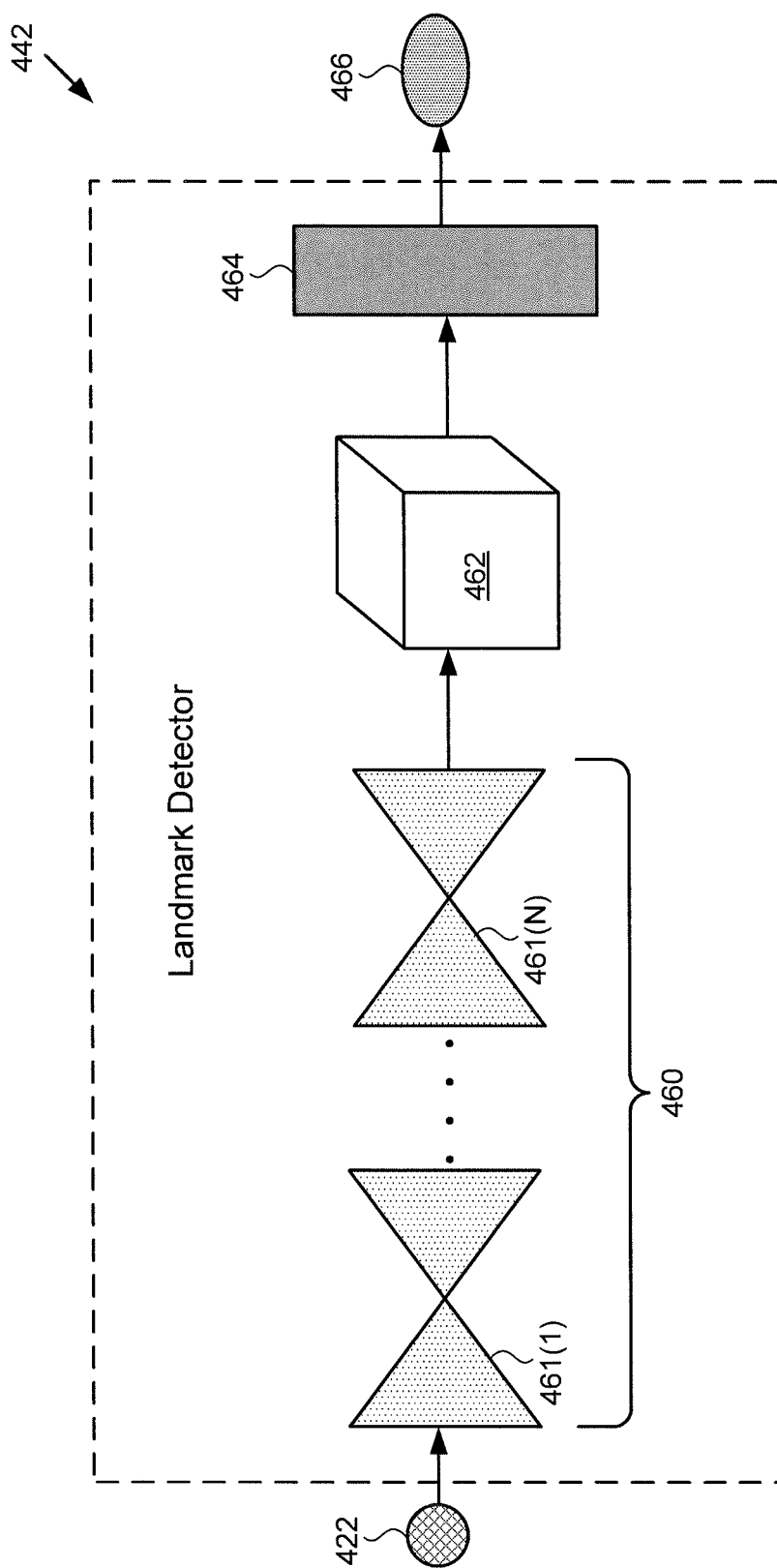
FIG. 4 shows an exemplary diagram of a landmark detector of the tracking module shown in FIG. 3.

FIG. 4 shows an exemplary diagram of a landmark detector of tracking module 340 in FIG. 3. As shown in FIG. 4, landmark detector 442 includes multi-stage hourglass network 460 having individual hourglass stages 461(1) to 461(N). In one implementation, for example, N may equal four. That is to say multi-stage hourglass network 460 may include four hourglass stages 461(1), 461(2), 461(3), and 461(N=4).

Also shown in FIG. 4 are 2D mappings 462 generated by multi-stage hourglass network 460, as well as skeletal landmark extraction block 464. In addition, FIG. 4 shows series of images 422 and L1 loss 466. Series of images 422 corresponds in general to images 122a/222a and 122b/222b, in FIGS. 1 and 2, as well as to series of images 322 in FIG. 3. Thus, series of images 422 may share any of the characteristics attributed to corresponding images 122a/222a, 122b/222b, and series of images 322 by the present disclosure, and vice versa.

Landmark detector 442, in FIG. 4, corresponds in general to landmark detector 342 of tracking module 340, in FIG. 3, and those corresponding features may share any of the characteristics attributed to either feature by the present disclosure. Thus, although not shown in FIG. 3, landmark detector 342 may include features corresponding to multi-stage hourglass network 460, 2D mappings 462 generated by multi-stage hourglass network 460, and skeletal landmark extraction block 464.

For each image of series of images 322/422, multi-stage hourglass network 460 can be used to predict the respective locations of skeletal landmarks. For example, in some implementations in which hand tracking is being performed, multi-stage hourglass network 460 may be used to predict the locations of twenty-one landmarks in the hand. The locations of the skeletal landmarks may be represented as 2D mappings 462 in the form of heatmaps in the image plane. Such a heatmap encodes the probability of finding a skeletal landmark at a particular location in the input image. Multi-stage hourglass network 460 may output one 2D mapping for every skeletal landmark. Consequently, in the exemplary use case in which hand tracking is performed using twenty-one skeletal landmarks, multi-stage hourglass network 460 generates twenty-one 2D mappings 462 for each image of series of images 322/422.

It is noted that most conventional neural network architectures that predict heatmaps are trained with direct supervision on the predicted heatmaps. The ground truth heatmaps that are necessary for such supervision are typically generated by blurring the position of the landmark by a Gaussian distribution with a user defined standard deviation. In contrast to such approaches, multi-stage hourglass network 460 is trained without explicit supervision on the heatmaps. Rather, multi-stage hourglass network 460 outputs a set of latent 2D mappings 462 from which sub-pixel accurate skeletal landmark positions may be extracted by skeletal landmark extraction block 464 using a spatial soft-argmax operation.

Moreover, additional constraints are imposed on the positions of the skeletal landmarks by jointly regressing the heatmaps of bones that connect pairs of skeletal landmarks. The heatmaps of these bones are also unsupervised. The pairwise multiplication of the heatmaps of two bones generates the 2D mapping of the location of the skeletal landmark at their intersection. The position of the skeletal landmark can be re-extracted from the result of the multiplication and is forced to lie at the same location as the ground truth.

FIG. 5 shows an exemplary diagram of a joint angle encoder suitable for use in tracking module 340 in FIG. 3. Joint angle encoder 546 is configured to learn joint angle latent space 570. It is noted that joint angles 238a/238b/338 are represented in tracking module 340 as complex mathematical quantities known as quaternions. Also shown in FIG. 5 are L2 loss 572, normalizing layer 574, and quaternion loss 576. Joint angle encoder 546 corresponds in general to joint angle encoder 346, in FIG. 3. That is to say, joint angle encoder 346 may share any of the characteristics attributed to joint angle encoder 546 by the present disclosure, and vice versa.

Once 2D skeletal landmarks are detected on each image of series of images 322/422 using landmark detector 342/442, joint angle encoder 346/546 may be configured to infer joint angles that can deform a rigged skeleton into a desired pose. In one implementation, for example, joint angle encoder 346/546 may take the form of a fully convolutional Wasserstein autoencoder.

In the exemplary use case of hand tracking, and using a purely synthetic dataset consisting of over three million 2D skeletal landmark to joint angle correspondences, joint angle encoder 346/546 can be trained to map multiple joint angles, such as fifteen joint angles for example, to low dimensional joint angle latent space 570, and reconstructs them from there. Because the movement of fingers is strongly related, it is contemplated that joint angle encoder 346/546 can learn the correlations between the various joint angles when it maps them onto joint angle latent space 570.

As noted above, the joint angles are represented as quaternions when providing them as an input to joint angle encoder 346/546. To ensure that joint angle encoder 346/546 always outputs valid quaternions, joint angle encoder 346/546 is trained with two losses. The predictions from the final layer of joint angle encoder 346/546 may be directly supervised with a mean square loss (MSE loss L2) 572 using ground truth quaternions. Additionally, normalization layer 574 can be used to normalize the activations of the final layer and further supervise them using quaternion loss 576 measuring the difference between the rotations represented by the two quaternions. It is noted that training joint angle encoder 346/546 with MSE loss 572 in addition to quaternion loss 576 ensures that the direct predictions from joint angle encoder 346/546 are already close to a quaternion and helps speed up convergence during training.

FIG. 6 shows an exemplary diagram of an inverse kinematics ANN of tracking module 340 in FIG. 3. As shown in FIG. 6, exemplary inverse kinematics ANN 644 includes fully connected layers 678, each of which may include five hundred and twelve features, for example. Also shown in FIG. 6 are input skeletal landmark locations 652, joint angle latent space 670, L2 loss 672, normalizing layer 674, and quaternion loss 676, as well as decoder 648, which may be implemented as a fully pre-trained Wasserstein decoder. Inverse kinematics ANN 644 corresponds in general to inverse kinematics ANN 344, in FIG. 3. That is to say, inverse kinematics ANN 344 may share any of the characteristics attributed to inverse kinematics ANN 644 by the present disclosure, and vice versa.

In addition, input skeletal landmark locations 652 correspond in general to locations 352, in FIG. 3, and those corresponding features may share any of the characteristics attributed to either corresponding feature by the present disclosure. Moreover joint angle latent space 670, L2 loss 672, normalizing layer 674, and quaternion loss 676 correspond respectively in general to joint angle latent space 570, L2 loss 572, normalizing layer 574, and quaternion loss 576, in FIG. 5.

It is noted that once latent space 570/670 of plausible joint angles has been learnt by joint angle encoder 346/546, fully connected inverse kinematics ANN 344/644 may be trained to regress to latent space 570/670. Joint angles may be reconstructed using pre-trained decoder 348/648, whose weights are fixed during the training of inverse kinematics ANN 344/644. At evaluation time too, inverse kinematics ANN 344/644 works together with decoder 348/648 to predict plausible joint angles given locations 352 of 2D skeletal landmarks.

The functionality of software code 110/310 and tracking module 340 will be further described by reference to FIG. 7 in combination with FIGS. 1, 2, and 3. FIG. 7 shows flowchart 780 presenting an exemplary method for performing pose estimation and body tracking using an ANN, according to one implementation. With respect to the method outlined in FIG. 7, it is noted that certain details and features have been left out of flowchart 780 in order not to obscure the discussion of the inventive features in the present application.

As a preliminary matter, it is noted that tracking module 340 is trained to track motions prior to its use in performing the method outlined by flowchart 780. Tracking module 340 may be trained using software code 110/310, executed by hardware processor 104, and using training module 332 and training database 334. As discussed in greater detail above by reference to FIGS. 4, 5, and 6, training of tracking module 340 may include providing individual body images from body image dataset 336a as training inputs to landmark detector 342 of tracking module 340. Training of tracking module 340 may continue iteratively until 3D poses 354 and joint angles 238a/238b/338 determined using tracking module 340 converge to the 3D pose and depth information corresponding respectively to the body images used for training and stored in dataset 336b.

Referring now to FIG. 7 in combination with FIG. 1 through FIG. 6, flowchart 780 begins with receiving series of images 322/422 of motion by subject 124 (action 781). Regarding individual images 122a/222a/122b/222b included in series of images 322/422, it is noted that each of images 122a/222a/122b/222b may include multiple digital RGB, RGB-D, or IR frames, for example, obtained by camera(s) 120a/220a and 120b/220b, and each capturing a different pose of subject 124 during motion by subject 124. Alternatively, series of images 322/422 may include multiple frames taken from a video clip obtained by camera(s) 120a/220a and 120b/220b.

For example, in one implementation, series of images 322/422 may include a sequence of single monocular images portraying motion by body 125 and/or hand(s) 126a/126b/226 of subject 124. As noted above, in some implementations, subject 124 may be a human subject or a robot. Moreover, in some of those implementations, the motion captured by series of images 322/422 may be or include a hand motion by the human subject or robot.

Series of images 322/422 may be received from camera(s) 120a/220a and 120b/220b via wireless communication link 250a and/or wired communication link 250b. Series of images 322/422 may be received by software code 110/310, executed by hardware processor 104 of computing platform 102.

Flowchart 780 continues with, for each image of series of images 322/422, using tracking module 340 trained to track motions to determine locations 352 each corresponding respectively to a 2D skeletal landmark of subject 124 based on constraints imposed by features of a hierarchical skeleton model intersecting at each 2D skeletal landmark (action 782). It is noted that although FIG. 2 depicts skeletal landmarks 228a and 228b as joint positions on hand(s) 126a/126b/226 of subject 124, that representation is merely exemplary. More generally, skeletal landmarks 228a and 228b may correspond to locations of any relevant joint or other structural or mechanical point of interests of body 125 of subject 124. Thus, in addition to, or as an alternative to hand joints, skeletal landmarks 228a and 228b may correspond to the locations of hip joints, leg joints, foot joints, shoulder joints, and arm joints of subject 124, as well as head, neck, and spine joints of subject 124, for example.

As noted above, tracking module 340 may include one or more deep neural networks, and may be configured to receive series of images 322/422 as inputs, and for each image return locations 352 including a list of 2D skeletal landmarks corresponding to the pose included in the image, e.g., joint positions 228a and 228b. Tracking module 340 has been previously trained over a large data set of body images, i.e., body image dataset 336a, as also noted above, but may be implemented so as to determine locations 352 including joint positions 228a and 228b of subject 124 based on each of images 122a/222a/122b/222b in an automated process.

Tracking module 340 may be constrained to determine locations 352 based on a hierarchical skeleton model in which 2D skeletal landmarks, such as joint positions, are dependent on the position of one or more other skeletal landmarks of subject 124, in contrast to a non-hierarchical skeleton model in which individual skeletal landmarks are treated as independent of one another. Determination of locations 352 may be performed by software code 110/310, executed by hardware processor 104 of computing platform 102, and using landmark detector 342/442 of tracking module 340, as discussed above by reference to FIG. 4.

Flowchart 780 continues with, for each image of series of images 322/422, using tracking module 340 to infer joint angles 238a/238b/338 of subject 124 based on locations 352 (action 783). It is noted that although FIG. 2 depicts joint angles 238a and 238b as joint angles on hand(s) 126a/126b/226 of subject 124, that representation is merely exemplary. More generally, joint angles 238a/238b/338 may correspond to the respective orientations of any relevant joint of body 125 of subject 124. Thus, in addition to, or as an alternative to hand joints, joint angles 238a/238b/338 may correspond to the orientations of hip joints, leg joints, foot joints, shoulder joints, and arm joints of subject 124, as well as head, neck, and spine joints of subject 124.

Determination of joint angles 238a/238b/338 of 3D pose 354 may be performed by software code 110/310, executed by hardware processor 104 of computing platform 102, and using joint angle encoder 346/546 of tracking module 340 as discussed above by reference to FIG. 5. Furthermore, like action 782, action 783 may be performed as an automated process.

Flowchart 780 continues with, for each image of series of images 322/422, using tracking module 340 to reconstruct a 3D pose of subject 124 based on locations 352 and joint angles 238a/238b/338, resulting in series of 3D poses 354 (action 783). Tracking module 340 may be configured to reconstruct a 3D pose for each image of series of images 322/422 using inverse kinematics ANN 344/644 and decoder 348/648, as discussed above by reference to FIG. 6. That is to say an inverse kinematic analytical or iterative process may be applied to 2D skeletal landmarks 228a and 228b included at locations 352 to determine a 3D pose most closely corresponding to locations 352 and joint angles 238a/238b/338. As discussed above, reconstruction of series of 3D poses based 354 on locations 352 and joint angles 238a/238b/338 may be performed by software code 110/310, executed by hardware processor 104 of computing platform 102, and using fully connected inverse kinematics ANN 344/644 and decoder 348/648 of tracking module 340. Moreover, like actions 782 and 783, action 784 may be performed as an automated process.

In some implementations, flowchart 780 can conclude with outputting tracking image 156/356 corresponding to the motion by subject 124 based on series of 3D poses 354 by subject 124 (action 785). In some implementations tracking image 156/356 may take the form of per frame tracking image data corresponding respectively to the input frames of series of images 322/422. However, in other implementations, tracking image 156/356 may include a synthesis of such per frame tracking image data to produce a substantially continuous replication of the motion by subject 124.

Tracking image 156/356 corresponding to motion by subject 124 can be advantageously utilized in a variety of applications. Examples of such applications include augmented reality (AR) applications, virtual reality (VR) applications, hand tracking based character animation, and extraction of motion by bipeds or quadrupeds from film footage, to name a few. Tracking image 156/356 may be output by software code 110/310, executed by hardware processor 104 of computing platform 102, and as noted above, is based on series of 3D poses 354 reconstructed using tracking module 340. In some implementations, hardware processor 104 may further execute software code 110/310 to render tracking image 156/356 on display 108.

Thus, the present application discloses a solution for performing pose estimation and body tracking using an ANN in a substantially automated process. The pose estimation and body tracking solutions disclosed by the present application make at least three significant contributions to the conventional art. First, a novel and inventive landmark detector is used, that imposes anatomical constraints on the position of skeletal landmarks of a subject being tracked. Second, using a large dataset of body images, a Wasserstein autoencoder is trained to map joint angles of a rigged hand or other body parts to a low dimensional latent space from which plausible 3D poses can be reconstructed. Third, a fully connected inverse kinematics ANN is introduced that learns to map positions of skeletal landmarks in an image to the latent space of the Wasserstein autoencoder, thereby allowing accurate reconstruction of the pose of the subject in 3D.

Consequently, the pose estimation and body tracking solution disclosed in the present application is more accurate than conventional approaches to pose estimation and body tracking using a color camera. In addition, the present solution enables use of a standard color camera for image capture, thereby advantageously avoiding any extra setup requirements. Furthermore, and in contrast to many conventional pose estimation techniques that merely provide 2D joint locations, the present pose estimation and body tracking solution advantageously provides 3D pose with depth, and is able to do so under general lighting conditions. As a result, the solution disclosed by the present application provides reliable, fast, accurate, and cost effective pose estimation and body tracking.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A pose estimation and body tracking system comprising:
    a computing platform including a hardware processor and a system memory;
    a software code stored in the system memory, the software code including a tracking module trained to track motions;
    the hardware processor configured to execute the software code to:
        receive a series of images of a motion by a subject;
        for each image of the series of images, determine, using the tracking module, a plurality of locations each corresponding respectively to a two-dimensional (2D) skeletal landmark of the subject based on constraints imposed by features of a hierarchical skeleton model intersecting at each 2D skeletal landmark;
        for each image of the series of images, infer, using the tracking module, a plurality of joint angles of the subject based on the plurality of locations;
        for each image of the series of images, reconstruct, using the tracking module, a three-dimensional (3D) pose of the subject based on the plurality of locations and the plurality of joint angles, resulting in a series of 3D poses by the subject; and
        output a tracking image corresponding to the motion by the subject based on the series of 3D poses by the subject.

2. The pose estimation and body tracking system of claim 1, wherein the hardware processor is further configured to execute the software code to render the tracking image on a display.

3. The pose estimation and body tracking system of claim 1, wherein the plurality of joint angles are represented as quaternions.

4. The pose estimation and body tracking system of claim 1, wherein the tracking module is configured to determine the series of 3D poses using a fully connected inverse kinematics artificial neural network (ANN).

5. The pose estimation and body tracking system of claim 1, wherein the subject comprises one of a human subject and a robot.

6. The pose estimation and body tracking system of claim 5, wherein the motion by the subject comprises a hand motion by the one of the human subject and the robot.

7. The pose estimation and body tracking system of claim 1, wherein the series of images comprises a series of single monocular images.

8. The pose estimation and body tracking system of claim 1, further comprising at least one camera configured to generate the series of images, wherein a body of the subject is in motion relative to the at least one camera.

9. A method for use by a pose estimation and body tracking system including a computing platform having a hardware processor and a system memory storing a software code including a tracking module trained to track motions, the method comprising:
    receiving, by the software code executed by the hardware processor, a series of images of a motion by a subject;
    for each image of the series of images, determining, by the software code executed by the hardware processor and using the tracking module, a plurality of locations each corresponding respectively to a two-dimensional (2D) skeletal landmark of the subject based on constraints imposed by features of a hierarchical skeleton model intersecting at each 2D skeletal landmark;
    for each image of the series of images, inferring, by the software code executed by the hardware processor and using the tracking module, a plurality of joint angles of the subject based on the plurality of 2D locations;
    for each image of the series of images, reconstructing, by the software code executed by the hardware processor and using the tracking module, a three-dimensional (3D) pose of the subject based on the plurality of locations and the plurality of joint angles, resulting in a series of 3D poses of the subject; and
    outputting, by the software code executed by the hardware processor, a tracking image corresponding to the motion by the subject based on the series of 3D poses of the subject.

10. The method of claim 9, further comprising rendering, by the software code executed by the hardware processor, the tracking image on a display.

11. The method of claim 9, wherein the plurality of joint angles are represented as quaternions.

12. The method of claim 9, wherein the tracking module is configured to determine the series of 3D poses using a fully connected inverse kinematics artificial neural network (ANN).

13. The method of claim 9, wherein the subject comprises one of a human subject and a robot.

14. The method of claim 13, wherein the motion by the subject comprises a hand motion by the one of the human subject and the robot.

15. The method of claim 9, wherein the series of images comprises a series of single monocular images.

16. The method of claim 9, wherein the system further comprises at least one camera configured to generate the series of images, and wherein a body of the subject is in motion relative to the at least one camera.

17. A method comprising:
    training an hourglass network of a landmark detector of a tracking module to determine a plurality of locations corresponding respectively to a plurality of two-dimensional (2D) skeletal landmarks of a body image based on constraints imposed by features of a hierarchical skeleton model intersecting at each of the plurality of 2D skeletal landmarks;
    training a joint angle encoder of the tracking module to map a plurality of joint angles of a rigged body part corresponding to the body image to a low dimensional latent space from which a plurality of three-dimensional (3D) poses of the body image can be reconstructed; and training an inverse kinematics artificial neural network (ANN) of the tracking module to map the plurality of locations corresponding respectively to the 2D skeletal landmarks of the body image to the low dimensional latent space of the joint angle encoder for accurate reconstruction of the pose of the body image in 3D.

18. The method of claim 17, wherein the joint angle encoder is trained using a purely synthetic dataset of skeletal landmark to joint angle correspondences.

19. The method of claim 17, wherein the plurality of joint angles are represented as quaternions.

20. The method of claim 17, wherein the joint angle encoder is implemented as a Wasserstein autoencoder.

* * * * *